(12) United States Patent
Tsujiko et al.

(10) Patent No.: US 12,080,884 B2
(45) Date of Patent: Sep. 3, 2024

(54) LITHIUM-ION BATTERY AND METHOD OF MANUFACTURING THE SAME

(71) Applicant: TOYOTA JIDOSHA KABUSHIKI KAISHA, Toyota (JP)

(72) Inventors: Akira Tsujiko, Miyoshi (JP); Hiroki Iguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/941,392

(22) Filed: Sep. 9, 2022

(65) Prior Publication Data

US 2023/0017772 A1 Jan. 19, 2023

Related U.S. Application Data

(63) Continuation of application No. 17/122,379, filed on Dec. 15, 2020.

(30) Foreign Application Priority Data

Dec. 25, 2019 (JP) .................. 2019-234478

(51) Int. Cl.
*H01M 10/44* (2006.01)
*H01M 4/133* (2010.01)
(Continued)

(52) U.S. Cl.
CPC ........... *H01M 4/386* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS

2015/0147658 A1* 5/2015 Nakagaki ................ H01M 4/13
429/231.95
2017/0092939 A1 3/2017 Kim et al.
(Continued)

FOREIGN PATENT DOCUMENTS

JP 2008-235083 A 10/2008
JP 2012-178269 A 9/2012
(Continued)

OTHER PUBLICATIONS

English translation of KR 2017/0067042 (Year: 2017).*
(Continued)

*Primary Examiner* — Yoshitoshi Takeuchi
(74) *Attorney, Agent, or Firm* — Oliff PLC

(57) ABSTRACT

Manufacturing a lithium-ion battery includes assembling the lithium-ion battery; and performing an initial charging on the lithium-ion battery. The lithium-ion battery includes a positive electrode, a negative electrode, and an electrolyte; the negative electrode contains a negative electrode active material containing a precursor of a silicon material, the precursor having a composition represented by $SiO_x$ where a relationship of $0<x<2$ is satisfied. The initial charging includes a first step where the charging is performed to an intermediate voltage at a first current rate, and a second step where the charging is performed from the intermediate voltage to a maximum voltage at a second current rate. The first current rate is lower than 0.5 C; the second current rate is higher than the first current rate; and the intermediate voltage is 3.75 V or higher.

13 Claims, 4 Drawing Sheets

(51) Int. Cl.
  *H01M 4/134* (2010.01)
  *H01M 4/1393* (2010.01)
  *H01M 4/1395* (2010.01)
  *H01M 4/38* (2006.01)
  *H01M 4/58* (2010.01)
  *H01M 4/583* (2010.01)
  *H01M 10/0525* (2010.01)
  *H01M 4/02* (2006.01)

(52) U.S. Cl.
  CPC ....... *H01M 4/1393* (2013.01); *H01M 4/1395* (2013.01); *H01M 4/5825* (2013.01); *H01M 4/583* (2013.01); *H01M 10/0525* (2013.01); *H01M 2004/027* (2013.01); *H01M 2004/028* (2013.01)

(56) References Cited

U.S. PATENT DOCUMENTS

2017/0133662 A1    5/2017   Cui et al.
2019/0305365 A1*  10/2019   Shi ..................... H01M 4/587

FOREIGN PATENT DOCUMENTS

| JP | 2014-010890 A | | 1/2014 | |
| JP | 2017-147247 A | | 8/2017 | |
| KR | 2017/0067042 | * | 6/2017 | .......... H01M 10/052 |
| WO | WO-2018094819 A1 | * | 5/2018 | ........ H01M 10/0525 |

OTHER PUBLICATIONS

Mar. 2, 2023 Office Action issued in U.S. Appl. No. 17/122,379.
Sep. 20, 2022 Office Action issued in U.S. Appl. No. 17/122,379.
Weili An, "Scalable Synthesis of Pore-Rich Si/C@C Core-Shell-Structured Microspheres for Practical Long Life Lithium-Ion Battery Anodes", ACS Applied Materials and Interfaces, 2022, 14, pp. 10308-10318.
Yuta Kimura et al, Characteristics Improvement of SiSnFeCu-alloy Powder for Anode Material of Lithium Ion Batteries Prepared through Atomizing Method, Daido Steel Co, Ltd., Nov. 20, 2015, pp. 101-106.
Dec. 11, 2023 U.S. Office Action issued in U.S. Appl. No. 17/122,379.
May 24, 2024 Office Action issued in U.S. Appl. No. 17/122,379.

* cited by examiner

LITHIUM-ION BATTERY AND METHOD OF MANUFACTURING THE SAME

CROSS-REFERENCE TO RELATED APPLICATION

This application is a continuation application of U.S. application Ser. No. 17/122,379, filed Dec. 15, 2020, the contents of which are incorporated herein by reference.

This application claims priority to Japanese Patent Application No. 2019-234478 filed on Dec. 25, 2019, incorporated herein by reference in its entirety.

BACKGROUND

1. Technical Field

The present disclosure relates to a lithium-ion battery and a method of manufacturing the same.

2. Description of Related Art

Japanese Unexamined Patent Application Publication No. 2017-147247 (JP 2017-147247 A) discloses that a negative electrode structure containing silicon oxide is charged and discharged at a current rate of 1.1 C to 3.0 C.

SUMMARY

A silicon (Si) material has been investigated as negative electrode active material of lithium-ion battery (hereinafter, may be abbreviated as "battery"). The advantage of Si material is that a specific capacity is large. The disadvantage of Si material is that a cycle life is short.

Conventionally, various studies have been made in order to improve the cycle life of Si material. For example, in JP 2017-147247 A, solely a negative electrode containing a Si material is charged and discharged at a predetermined current rate before assembling a battery. JP 2017-147247 A discloses that a Si network develops in a three-dimensional network in the Si material by the charge and discharge. JP 2017-147247 A discloses that the cycle life is improved by forming the Si network. However, a battery containing a Si material has room for improvement in storage characteristics.

The present disclosure provides a battery containing a Si material with improved storage characteristics.

Hereinafter, technical configurations and effects of the present disclosure will be described. Note that, the mechanism of action of the present disclosure includes an assumption. Whether the mechanism of action is right or wrong does not limit the scope of the claims.

A first aspect of the present disclosure relates to a lithium-ion battery that includes a positive electrode, a negative electrode, and an electrolyte. The negative electrode contains a negative electrode active material. The negative electrode active material contains a silicon material. The silicon material contains a silicon alloy phase and a silicate phase. The silicon alloy phase has a three-dimensional network structure. The silicate phase is arranged in a mesh of the three-dimensional network structure. The average mesh size of the three-dimensional network structure is 2.8 nm to 3.5 nm.

The Si material according to the first aspect contains a Si alloy phase and a silicate phase. The Si alloy phase contains an alloy of lithium (Li) and Si. The Si alloy phase has a three-dimensional network structure. It is considered that Li is mainly stored in the Si alloy phase. The silicate phase contains Li silicate. The silicate phase is arranged in a mesh of the three-dimensional network structure. With the storage and release of Li, the Si alloy phase expands and contracts. It is considered that the silicate phase may mitigate the volume change of the Si alloy phase. Furthermore, it is considered that the silicate phase may impede the decomposition reaction of the electrolyte.

The three-dimensional network structure of the Si alloy phase may be confirmed in a Si distribution image by Scanning Transmission Electron Microscopy-Electron Energy-Loss Spectroscopy (STEM-EELS).

According to the first aspect, the denseness of the three-dimensional network structure may change depending on the condition of the initial charging of the battery. Storage characteristics tend to be improved when the three-dimensional network structure has an appropriate denseness. That is, when the average mesh size of the three-dimensional network structure is 2.8 nm or more and 3.5 nm or less, the storage characteristics tend to be improved.

It is considered that the three-dimensional network structure (Si alloy phase) also functions as a Li transmission path. It is considered that capacity deterioration is less likely to occur when the Li transmission path has an appropriate denseness.

In the lithium-ion battery according to the first aspect, the negative electrode active material may further contain a carbon material.

A second aspect of the present disclosure relates to a manufacturing method of a lithium-ion battery. The manufacturing method includes assembling the lithium-ion battery and performing an initial charging on the lithium-ion battery. The lithium-ion battery includes a positive electrode, a negative electrode, and an electrolyte. The negative electrode contains a negative electrode active material. The negative electrode active material contains a precursor of a silicon material. The precursor has a composition represented by $SiO_x$. In the formula, the relationship of $0<x<2$ is satisfied. The initial charging includes a first step and a second step. In the first step, the charging is performed to an intermediate voltage at a first current rate. In the second step, the charging is performed from the intermediate voltage to a maximum voltage at a second current rate. The first current rate is lower than 0.5 C. The second current rate is higher than the first current rate. The intermediate voltage is 3.75 V or higher.

In the present disclosure, "C" is used as the unit of current rate. "1 C" is defined as a current rate at which full charge capacity of the battery is charged in one hour. For example, 0.5 C indicates a current rate of 0.5 times 1 C. At the current rate of 0.5 C, the full charge capacity is charged in two hours.

In the present disclosure, the initial charging is divided into two steps. In the first step, the charging is performed to an intermediate voltage at a relatively low current rate. In the second step, the charging is performed from the intermediate voltage to the maximum voltage at a relatively high current rate. Although the mechanism is unclear, under the conditions described in the second aspect, a three-dimensional network structure having an appropriate denseness tends to be formed.

In the manufacturing method of a lithium-ion battery according to the second aspect, the negative electrode active material may further contain a carbon material.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure (hereinbelow, also referred to as "the present embodiment") will be described. Note that, the following description does not limit the scope of the claims.

In the present embodiment, for example, an expression such as "2.8 nm to 3.5 nm" indicates a range including boundary values, unless otherwise specified. That is, for example, "2.8 nm to 3.5 nm" indicates a range of "2.8 nm or more and 3.5 nm or less".

Lithium-Ion Battery

In the present embodiment, "lithium-ion battery" means a secondary battery that contains lithium (Li) ions as a charge carrier. The battery in the present embodiment can be in any form. For example, the battery may be in the form of a square battery, a cylindrical battery, or a pouch-type battery. In the present embodiment, a pouch-type battery will be described as an example. The pouch-type battery is also called a "laminate-type battery".

Figure 1:
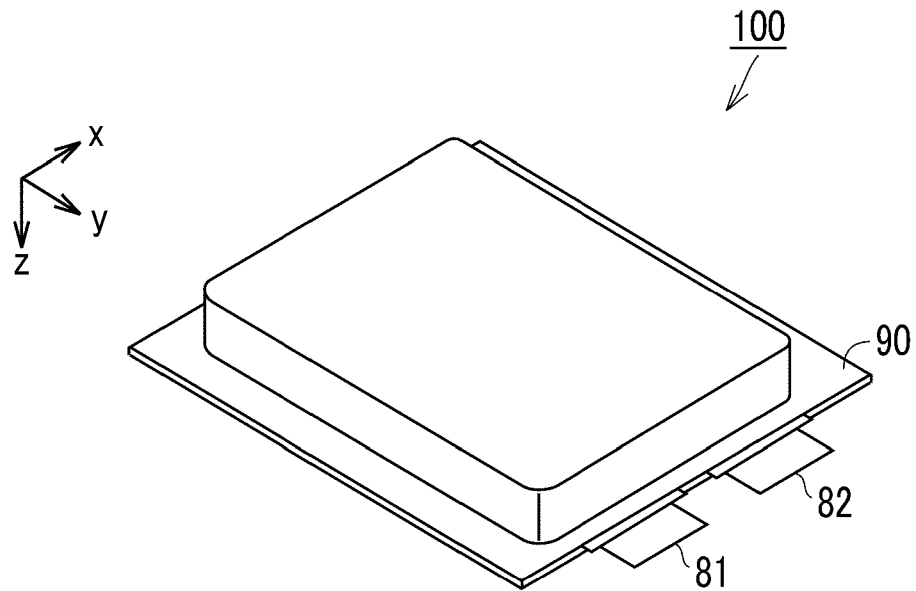
FIG. 1 is a first schematic view of a lithium-ion battery in the present embodiment.

FIG. 1 is a first schematic view of the lithium-ion battery in the present embodiment. A battery 100 is a pouch-type battery. The battery 100 includes an exterior material 90. The exterior material 90 is a pouch made of an aluminum laminated film. The exterior material 90 is sealed. The exterior material 90 can be sealed, for example, by heat sealing. Each of a positive electrode terminal 81 and a negative electrode terminal 82 is exposed to the outside of the exterior material 90.

Figure 2:
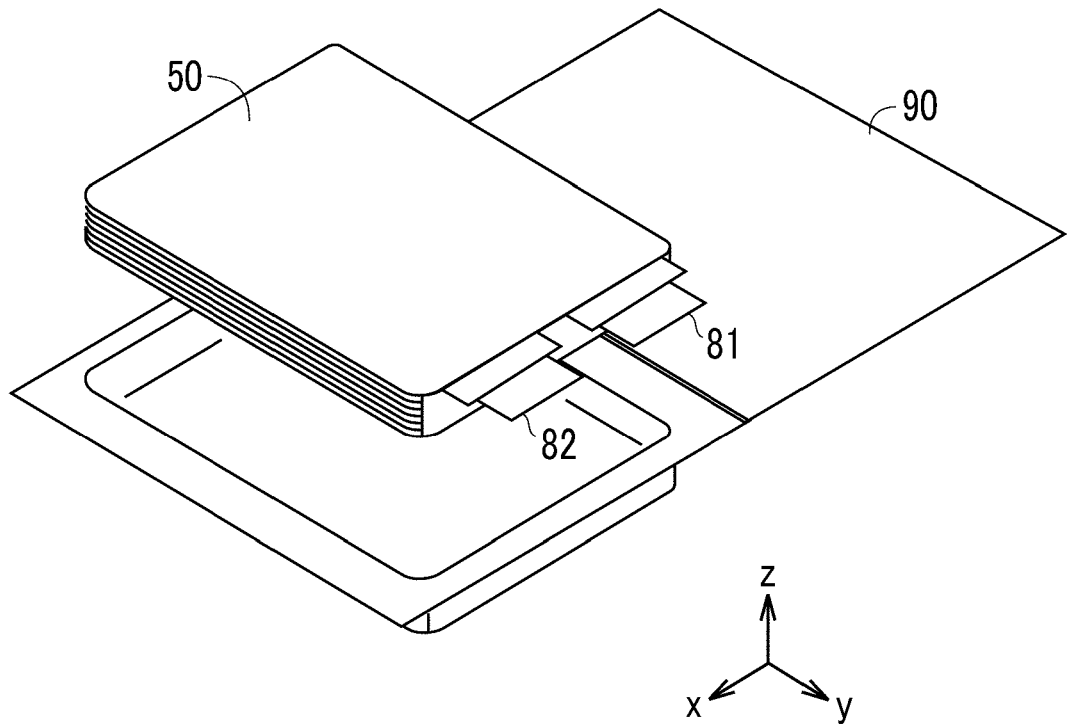
FIG. 2 is a second schematic view of the lithium-ion battery in the present embodiment.

FIG. 2 is a second schematic view of the lithium-ion battery in the present embodiment. The exterior material 90 accommodates a power storage element 50 and an electrolyte (not shown). That is, battery 100 includes the power storage element 50 and the electrolyte. Each of the positive electrode terminal 81 and the negative electrode terminal 82 is connected to the power storage element 50.

Figure 3:
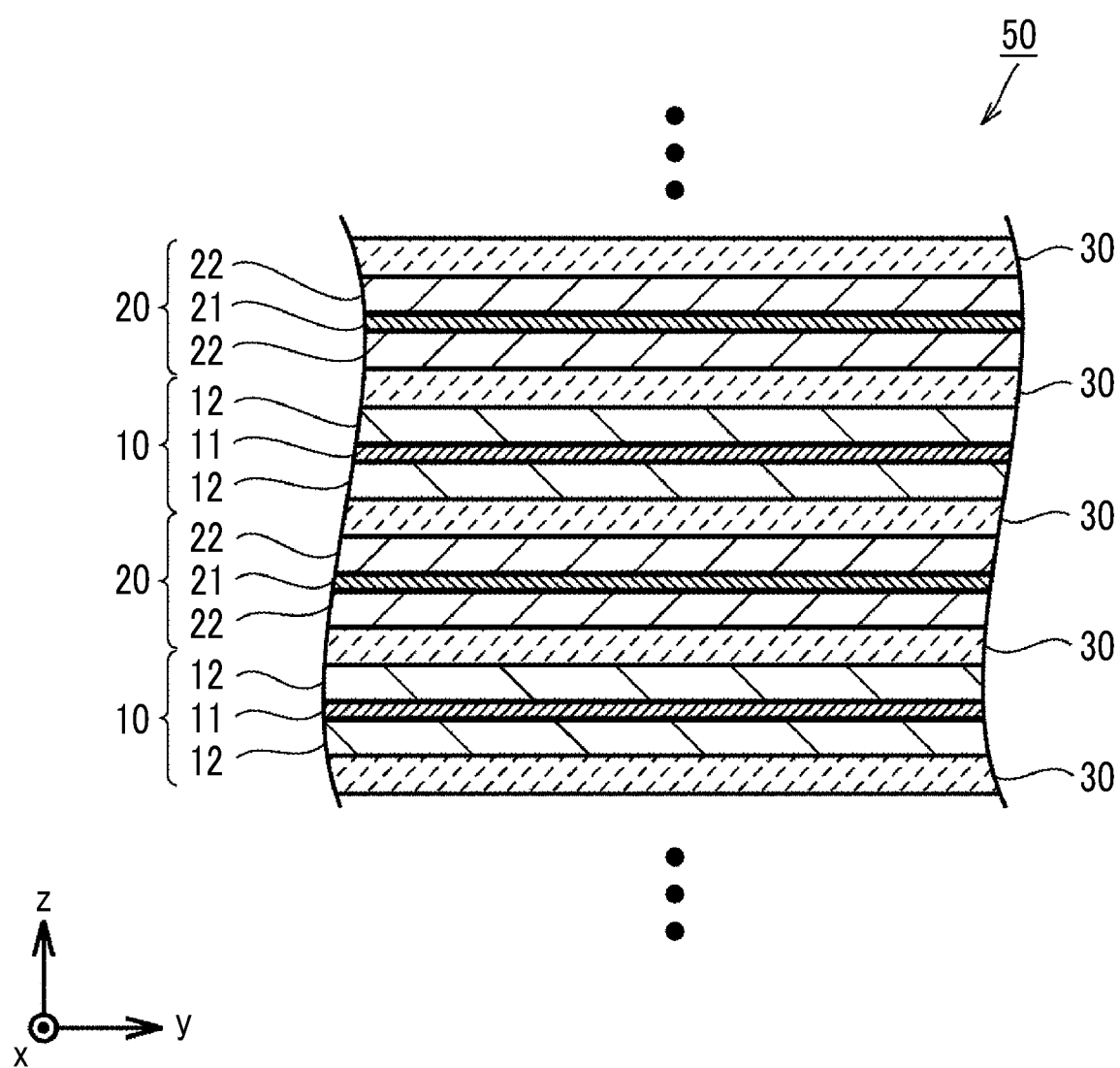
FIG. 3 is a schematic cross-sectional view of a power storage element in the present embodiment.

FIG. 3 is a schematic cross-sectional view of a power storage element in the present embodiment. The power storage element 50 is a laminate(stack)-type power storage element. The power storage element 50 is formed by laminating three or more sheet-shaped electrodes. The power storage element may be a wound-type power storage element. That is, the power storage element may be formed by spirally winding a belt-shaped electrode.

The power storage element 50 includes a positive electrode 10, a negative electrode 20, and a separator 30. That is, the battery 100 includes the positive electrode 10 and the negative electrode 20. The positive electrodes 10 and the negative electrodes 20 are alternately laminated. The separator 30 is arranged between the positive electrode 10 and the negative electrode 20.

Negative Electrode

The negative electrode 20 has a sheet shape. The negative electrode 20 may include, for example, a negative electrode current collector 21 and a negative electrode active material layer 22. The negative electrode current collector 21 may have a thickness of, for example, 5 μm to 50 μm. The negative electrode current collector 21 may contain a copper (Cu) foil or the like.

The negative electrode active material layer 22 is formed on a surface of the negative electrode current collector 21. The negative electrode active material layer 22 may be formed on solely one surface of the negative electrode current collector 21. The negative electrode active material layer 22 may be formed on both front and back surfaces of the negative electrode current collector 21. The negative electrode active material layer 22 may have a thickness of, for example, 10 μm to 200 μm.

The negative electrode active material layer 22 contains a negative electrode active material. That is, the negative electrode 20 contains a negative electrode active material. The negative electrode active material layer 22 may substantially consist of the negative electrode active material. The negative electrode active material contains a Si material. The negative electrode active material may substantially consist of the Si material.

Si Material

The Si material may be a particle group (powder), for example. The Si material may have a median diameter of, for example, 0.01 μm to 20 μm. The Si material may have a median diameter of, for example, 0.1 μm to 10 μm. The Si material may have a median diameter of, for example, 0.5 μm to 5 μm. The "Median diameter" in the present embodiment refers to a particle diameter at which the cumulative particle volume from a small particle side in a volume-based particle diameter distribution accounts for 50% of the total particle volume. The median diameter can be measured by a laser diffraction type particle diameter distribution measuring device or the like.

The Si material in the present embodiment is generated by the reaction between a precursor and Li at the time of initial charging. The precursor is an oxide of Si. The precursor has a composition represented by the following formula (I):

$$SiO_x \quad (I).$$

In the formula (I), the relationship of "0<x<2" is satisfied. For example, the relationship of "0.5≤x≤1.5" may be satisfied. For example, the relationship of "0.8≤x≤1.2" may be satisfied.

The Si material contains a Si alloy phase and a silicate phase. The Si alloy phase contains an alloy of Li and Si. The Si alloy phase may substantially consist of the LiSi alloy. It is considered that Li is mainly stored in the Si alloy phase. With the storage and release of Li, the Si alloy phase expands and contracts.

The silicate phase contains Li silicate. The silicate phase may substantially consist of the Li silicate. It is considered that the silicate phase may mitigate the volume change of the Si alloy phase. Furthermore, it is considered that the silicate phase may impede the decomposition reaction of the electrolyte.

The Li silicate may have a composition represented by, for example, the following formula (II):

$$Li_ySiO_z \quad (II).$$

In the formula (II), for example, the relationship of "1≤y≤8, 2.5≤z≤6" may be satisfied. In the formula (II), the relationships of "y=z=4", "y=2, z=3", "y=1, z=2.5", "y=3, z=3.5", "y=⅔, z=⅞", "y=8, z=6", or the like may be satisfied.

Average Mesh Size

Figure 4:
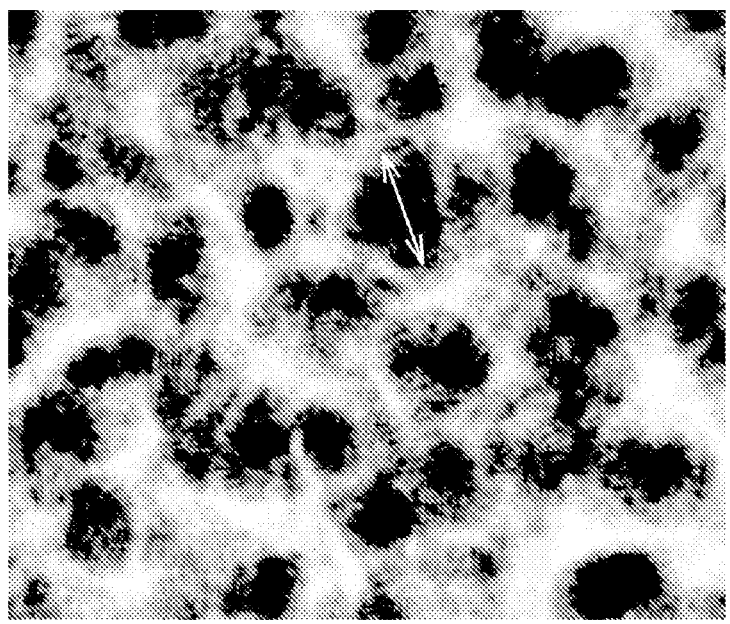
FIG. 4 is a first example of a Si distribution image by STEM-EELS.

FIG. 4 is a first example of a Si distribution image by STEM-EELS. The Si alloy phase is three-dimensionally continuous. The Si alloy phase forms a network skeleton. That is, the Si alloy phase has a three-dimensional network structure. In the Si alloy phase, metallic Si is distributed at a high concentration. The Si distribution image by STEM-EELS is considered to represent the structure of the Si alloy phase. In FIG. 4, the white portion (bright portion) extending in a three-dimensional network is considered to represent the Si alloy phase. The black portion (dark portion) forms a mesh of the three-dimensional network white portion. The black portion is considered to represent the silicate phase. That is, the silicate phase is arranged in the mesh of the three-dimensional network structure.

In the present embodiment, the average mesh size is 2.8 nm to 3.5 nm. Within the range, improvement in storage characteristics is expected. When the average mesh size is less than 2.8 nm, the desired storage characteristics may not be realized. Even though the average mesh size exceeds 3.5 nm, the desired storage characteristics may not be realized. The average mesh size may be, for example, 3.1 nm or more. The average mesh size may be, for example, 3.3 nm or less.

Measuring Method of Average Mesh Size

The average mesh size in the present embodiment is measured by the following procedure. The battery 100 is discharged to 2.5 V at a current rate of 0.2 C. After the discharging, the negative electrode 20 is collected by disassembling the battery 100. The negative electrode 20 is cleaned with a predetermined organic solvent. After the cleaning, a sectional sample of the negative electrode active material layer 22 is produced by cutting the negative electrode 20. The surface of the sectional sample is smoothed by Focused Ion Beam (FIB).

The sectional sample is observed by STEM. The observation magnification is, for example, about 100,000 times to 500,000 times. An enlarged image of the Si material is acquired as an Annular Dark Field-STEM (ADF-STEM) image. Further, the EELS spectrum is acquired by the EELS detector.

A STEM-EELS image is formed by imaging a position where the EELS spectrum of 15 eV to 18 eV is detected. That is, the Si distribution image (for example, FIG. 4) is acquired. In the Si distribution image, the Si alloy phase is displayed as the white portion (bright portion). The silicate phase is displayed as the black portion (dark portion). The unidirectional diameters of the black portion are measured at 20 locations. In the present embodiment, the arithmetic mean value of the unidirectional diameters at 20 locations is regarded as the "average mesh size".

Carbon Material

The negative electrode active material may further contain a carbon material in addition to the Si material. The Si material and the carbon material may be compounded. Both large capacity and long cycle life are expected to be achieved when the negative electrode active material further contains a carbon material. The carbon material may be a particle group, for example. The carbon material may have a median diameter of, for example, 1 μm to 20 μm. The carbon material may have a median diameter of, for example, 1 μm to 10 μm.

The carbon material can contain any component as long as the carbon material can function as the negative electrode active material. For example, the carbon material may contain at least one selected from the group consisting of graphite, soft carbon, and hard carbon.

In the present embodiment, the mixing ratio of the Si material and the carbon material is arbitrary. For example, the relationships of "Si material/carbon material=1/99" to "Si material/carbon material=99/1" may be satisfied. For example, the relationships of "Si material/carbon material=1/99" to "Si material/carbon material=30/70" may be satisfied. For example, the relationships of "Si material/carbon material=5/95" to "Si material/carbon material=25/75" may be satisfied. For example, the relationships of "Si material/carbon material=10/90" to "Si material/carbon material=20/80" may be satisfied.

Other Components

The negative electrode active material layer 22 may further contain a conductive material in addition to the negative electrode active material. The conductive material has electron conductivity. The conductive material may contain any component. The conductive material may contain, for example, at least one selected from the group consisting of acetylene black (AB), vapor grown carbon fiber (VGCF), carbon nanotube (CNT), and graphene flake. The blended amount of the conductive material may be, for example, 0.1 parts by mass to 20 parts by mass with respect to 100 parts by mass of the negative electrode active material.

The negative electrode active material layer 22 may further contain a binder in addition to the negative electrode active material. The binder bonds solids together. The binder may contain any component. The binder may contain, for example, at least one selected from the group consisting of carboxymethyl cellulose (CMC), styrene butadiene rubber (SBR), polyacrylic acid (PAA), butyl rubber (IIR), polyimide (PI), polytetrafluoroethylene (PTFE), polyvinylidene fluoride (PVdF), and vinylidene fluoride-hexafluoropropylene copolymer (PVdF-HFP). The blended amount of the binder may be, for example, 0.1 parts by mass to 10 parts by mass with respect to 100 parts by mass of the negative electrode active material.

Positive Electrode

The positive electrode 10 has a sheet shape. The positive electrode 10 may include, for example, a positive electrode current collector 11 and a positive electrode active material layer 12. The positive electrode current collector 11 may have a thickness of, for example, 5 μm to 50 μm. The positive electrode current collector 11 may contain an aluminum (Al) foil or the like.

The positive electrode active material layer 12 is formed on a surface of the positive electrode current collector 11. The positive electrode active material layer 12 may be formed on solely one surface of the positive electrode current collector 11. The positive electrode active material layer 12 may be formed on both front and back surfaces of the positive electrode current collector 11. The positive electrode active material layer 12 may have a thickness of, for example, 10 μm to 200 μm.

The positive electrode active material layer 12 contains a positive electrode active material. The positive electrode active material layer 12 may substantially consist of the positive electrode active material. The positive electrode active material may be a particle group, for example. The positive electrode active material may have a median diameter of, for example, 1 μm to 30 μm.

The positive electrode active material may contain any component. The positive electrode active material may contain, for example, at least one selected from the group consisting of lithium cobalt oxide, lithium nickel oxide, lithium manganate, nickel cobalt lithium manganate, nickel cobalt lithium aluminate, and lithium iron phosphate.

The positive electrode active material layer 12 may further contain a conductive material in addition to the positive electrode active material. The conductive material may contain any component. The conductive material may contain acetylene black or the like. The blended amount of the conductive material may be, for example, 0.1 parts by mass to 10 parts by mass with respect to 100 parts by mass of the positive electrode active material.

The positive electrode active material layer 12 may further contain a binder in addition to the positive electrode active material. The binder may contain any component. The binder may contain PVdF or the like. The blended amount of the binder may be, for example, 0.1 parts by mass to 10 parts by mass with respect to 100 parts by mass of the positive electrode active material.

Electrolyte

The electrolyte is a Li ion conductor. The electrolyte may be a solid, a gel, or a liquid. That is, the battery 100 in the present embodiment may be an all-solid state battery, a polymer battery, or a liquid battery. In the present embodiment, a liquid electrolyte will be described as an example. The liquid electrolyte may contain, for example, an electrolytic solution or an ionic liquid.

The electrolytic solution contains a solvent and a supporting electrolyte. The solvent is aprotic. The solvent may dissolve the supporting electrolyte. The solvent may contain, for example, at least one selected from the group consisting of fluoroethylene carbonate (FEC), ethylene carbonate (EC), propylene carbonate (PC), butylene carbonate (BC), ethyl methyl carbonate (EMC), dimethyl carbonate (DMC), and diethyl carbonate (DEC).

The supporting electrolyte contains an ionic compound. The supporting electrolyte contains Li. The supporting electrolyte may contain, for example, at least one selected from the group consisting of $LiPF_6$, $LiBF_4$, and $Li(FSO_2)_2N$. The concentration of the supporting electrolyte may be, for example, 0.5 mol/L to 2 mol/L. The electrolytic solution may further contain various additives in addition to the solvent and the supporting electrolyte. The additives may contain at least one selected from the group consisting of vinylene carbonate (VC), vinylethylene carbonate (VEC), 1,3-propanesultone (PS), cyclohexylbenzene (CHB), tert-amylbenzene (TAB), and lithium bisoxalate borate (Li-BOB), for example.

Separator

The separator 30 is interposed between the positive electrode 10 and the negative electrode 20. The separator 30 physically separates the positive electrode 10 and the negative electrode 20 from each other. For example, in an all-solid state battery, an electrolyte may function as a separator.

The separator 30 may have a sheet shape, for example. The separator 30 may have a thickness of, for example, 5 μm to 30 μm. The separator 30 is porous. A plurality of pores is formed on the inside of the separator 30. The pores can retain the electrolytic solution. The separator 30 may have a porosity of 30% to 60%, for example. The porosity can be measured by mercury intrusion porosimetry.

The separator 30 may be made of polyolefin, for example. The separator 30 may be made of polyethylene (PE), for example. The separator 30 may be made of polypropylene (PP), for example. The separator 30 may have a single layer structure, for example. The separator 30 may substantially consist of a PE layer, for example. The separator 30 may have a multilayer structure, for example. The separator 30 may be formed, for example, by laminating a PP layer, a PE layer, and a PP layer in this order. A surface of the separator 30 may be coated with a ceramic material, for example. The ceramic material can impart heat resistance to the surface of the separator 30.

Manufacturing Method of Lithium-Ion Battery

Figure 6:
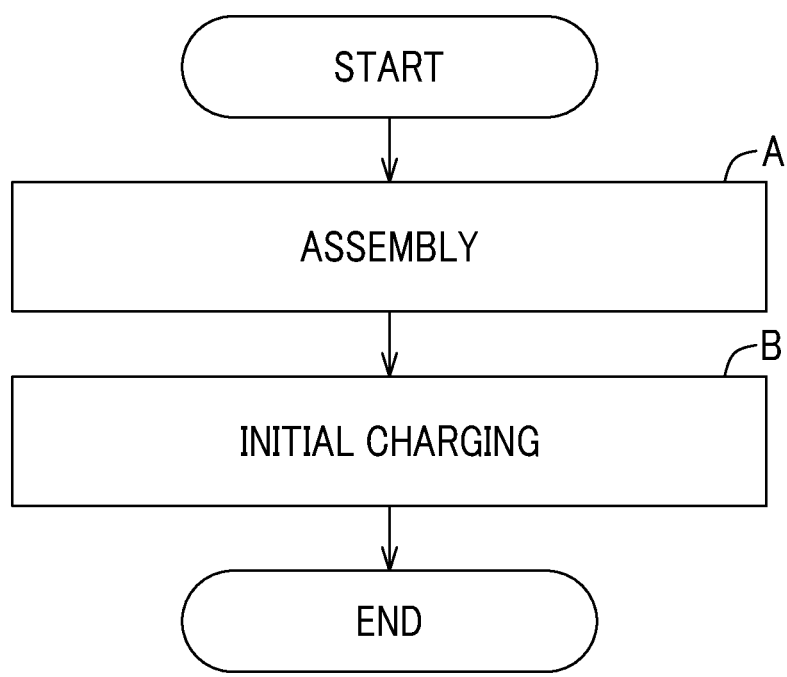
FIG. 6 is a schematic flowchart of a manufacturing method of a lithium-ion battery in the present embodiment.

FIG. 6 is a schematic flowchart of a manufacturing method of a lithium-ion battery in the present embodiment. The manufacturing method of a lithium-ion battery in the present embodiment includes <<(A) assembly>> and <<(B) initial charging>>.

(A) Assembly

The manufacturing method of a lithium-ion battery in the present embodiment includes assembling the battery 100. The battery 100 includes the positive electrode 10, the negative electrode 20, and the electrolyte. The details of the battery 100 are as described above. The battery 100 is assembled by any method. The negative electrode active material contains the precursor of the Si material before the initial charging. The precursor has a composition represented by the formula (I).

(B) Initial Charging

The manufacturing method of a lithium-ion battery in the present embodiment includes performing the initial charging on the battery 100. When the initial charging is performed, the precursor ($SiO_x$) reacts with Li. As a result, it is considered that the precursor is disproportionate in the Si alloy phase and the silicate phase. Furthermore, it is considered that the three-dimensional network structure is formed by the growth of the Si alloy phase in the three-dimensional network. In the present embodiment, the initial charging is performed such that the three-dimensional network structure has an average mesh size of 2.8 nm to 3.5 nm.

The initial charging is performed by a charging device. The charging device may be a charging and discharging device. The initial charging may be performed in a room temperature environment. For example, the initial charging may be performed in a thermostat set at 15° C. to 30° C.

In the present embodiment, the initial charging is divided into two steps. That is, the initial charging includes a first step and a second step.

First Step

The first step is charging in the range from the uncharged voltage to the intermediate voltage. The first step charging may be a constant current (CC) method. In the first step, the charging is performed to an intermediate voltage at a first current rate.

The intermediate voltage is 3.75 V or higher. When the intermediate voltage is less than 3.75 V, the average mesh size may exceed 3.5 nm. The intermediate voltage may be, for example, 3.75 V to 3.9 V.

The first current rate is lower than 0.5 C. When the first current rate is 0.5 C or higher, the average mesh size may exceed 3.5 nm. The first current rate may be, for example, 0.1 C to 0.3 C.

Second Step

After the voltage reaches the intermediate voltage, the initial charging shifts from the first step to the second step. The second step is charging in the range from the intermediate voltage to the maximum voltage. The second step charging may be a CC method. In the second step, the charging is performed from the intermediate voltage to a maximum voltage at a second current rate.

The second current rate is higher than the first current rate. When the second current rate is equal to or less than the first current rate, the average mesh size may be less than 2.8 nm. The second current rate may be, for example, 0.3 C to 1 C.

The maximum voltage is a voltage higher than the intermediate voltage. The maximum voltage is the maximum value of the voltage in the initial charging. The maximum voltage in the initial charging may be equal to the maximum voltage in a working voltage range of battery 100. The maximum voltage may be, for example, 4.1 V to 4.3 V. The maximum voltage may be, for example, 4.2 V to 4.3 V. The initial charging is completed when the voltage of the battery 100 reaches the maximum voltage.

Other Operations

After the initial charging, the battery 100 may be discharged, for example. After the initial charging, heat aging may be performed on the battery 100, for example. For example, the battery 100 may be left in a temperature environment of 50° C. to 70° C. for about 24 hours to 48 hours.

The lithium-ion battery is manufactured in the manner described above. In the lithium-ion battery (finished product) of the present embodiment, improvement in storage characteristics is expected. It is considered that the three-dimensional network structure of the Si alloy phase has an appropriate denseness.

Hereinafter, examples of the present disclosure (hereinbelow, also referred to as "the present examples") will be described. Note that, the following description does not limit the scope of the claims.

Manufacture of Lithium-Ion Battery

Various lithium-ion batteries were manufactured by the following procedure.

Example 1

(A) Assembly

1. Production of Positive Electrode

The following materials were prepared.

Positive electrode active material: $LiNi_{1/3}Co_{1/3}Mn_{1/3}O_2$ (median diameter of 10 µm)
Conductive material: acetylene black
Binder: PVdF
Dispersion medium: N-methyl-2-pyrrolidone
Positive electrode current collector: Al foil A slurry was prepared by mixing the positive electrode active material, the conductive material, the binder, and the dispersion medium. The surfaces (both front and back surfaces) of the positive electrode current collector were coated with the slurry and then dried. In this way, positive electrode active material layers were formed on the surfaces of the positive electrode current collector. The composition of the positive electrode active material layer was "positive electrode active material/conductive material/binder=87/10/3 (mass ratio)".

A positive electrode raw material was manufactured in the manner described above. A plurality of positive electrodes was manufactured by cutting the positive electrode raw material.

2. Production of Negative Electrode

A powder of $SiO_2$ (commercially available product) and a powder of metallic Si (commercially available product) were mixed. Thereby, a mixed powder was prepared. A reaction vessel was prepared. The reaction vessel had a sealed structure. The reaction vessel was filled with the mixed powder prepared in advance. In the reaction vessel, the mixed powder was heated to a temperature of 1300° C. to 1400° C. under an argon (Ar) atmosphere. As a result, sublimation gas was generated. It is considered that the composition of the sublimation gas was $SiO_x$ (x=1). By cooling the sublimation gas, a SiO powder was formed. The SiO powder was collected. The SiO powder was ground.

The following materials were prepared.

Negative electrode active material: precursor of Si material (SiO prepared above), carbon material (commercial artificial graphite)
Binder: "SBR/CMC=1/1 (mass ratio)"
Dispersion medium: water
Negative electrode current collector. Cu foil The negative electrode active material was prepared by mixing 76 parts by mass of the carbon material and 20 parts by mass of the precursor (SiO). A slurry was prepared by mixing the negative electrode active material, the binder, and the dispersion medium. The surfaces (both front and back surfaces) of the negative electrode current collector were coated with the slurry and then dried. In this way, negative electrode active material layers were formed on the surfaces of the negative electrode current collector. The composition of the negative electrode active material layer was "negative electrode active material/binder=96/4 (mass ratio)".

A negative electrode raw material was manufactured in the manner described above. A plurality of negative electrodes was manufactured by cutting the negative electrode raw material.

3. Formation of Power Storage Element

A separator was prepared. The positive electrode and the negative electrode were alternately laminated while the separator was sandwiched between the positive electrode and the negative electrode. As a result, a laminate-type power storage element was formed. The power storage element included seven positive electrodes and eight negative electrodes. The positive electrode terminals and the negative electrode terminals were connected to the power storage element.

4. Liquid Injection

A pouch made of an aluminum laminated film was prepared as an exterior material. The power storage element was accommodated in the exterior material. The electrolytic solution was injected into the exterior material. The electrolytic solution contained the following components.

Solvent: "FEC/EC/DMC/EMC=1/2/4/3 (volume ratio)"
Supporting electrolyte: $LiPF_6$ (concentration=1.0 mol/L)

After the injection of the electrolytic solution, the exterior material was sealed by heat sealing. A test battery was assembled in the manner described above.

(B) Initial Charging

Two metal plates were prepared. The test battery was sandwiched between two metal plates. The two metal plates were fixed such that a predetermined pressure was applied to the power storage element.

First Step

In an environment with a temperature of 25° C., the battery was charged to the intermediate voltage of 3.75 V at a first current rate of 0.1 C. The charging was performed by a CC method.

Second Step

In an environment with a temperature of 25° C., the battery was charged to the maximum voltage of 4.3 V at a second current rate of 1 C. The charging was performed by a CC method.

After the initial charging, the test battery was discharged to 2.5 V at a current rate of 0.2 C. The discharge capacity at this time was considered to be an initial capacity. The test battery was manufactured in the manner described above.

In the present example, two test batteries were manufactured for each specification. One of the test batteries was used to measure the average mesh size. The other test battery was used to evaluate the storage characteristics.

Example 2

As shown in the following Table 1, a test battery was manufactured in the same manner as in Example 1 except that the first current rate in the initial charging was changed.

Example 3

As shown in the following Table 1, a test battery was manufactured in the same manner as in Example 1 except that the second current rate in the initial charging was changed.

Example 4

As shown in the following Table 1, a test battery was manufactured in the same manner as in Example 1 except that the intermediate voltage in the initial charging was changed.

Comparative Example 1

As shown in the following Table 1, the initial charging was consistently performed without dividing the initial charging into the first step and the second step. The current rate was 1 C. A test battery was manufactured in the same manner as in Example 1 except for the above description.

Comparative Example 2 and Comparative Example 3

As shown in the following Table 1, a test battery was manufactured in the same manner as in Example 1 except that the first current rate in the initial charging was changed.

Comparative Example 4

As shown in the following Table 1, a test battery was manufactured in the same manner as in Example 1 except that the second current rate in the initial charging was changed.

Comparative Example 5

As shown in the following Table 1, a test battery was manufactured in the same manner as in Example 2 except that the second current rate in the initial charging was changed.

Comparative Example 6

As shown in the following Table 1, a test battery was manufactured in the same manner as in Example 2 except that the intermediate voltage in the initial charging was changed.

Evaluation

Average Mesh Size

According to the method described above, the test battery was disassembled and the average mesh size was measured in each specification. In the present example, EMC was used as the organic solvent for cleaning the negative electrode.

Storage Characteristics

The test battery was charged to 4.2 V at a current rate of 0.2 C. The test battery in a charged state was stored for 28 days in a thermostat set at 60° C.

After 28 days, the test battery was discharged to 2.5 V at a current rate of 0.2 C in a room temperature environment. Next, the test battery was charged to 4.1 V at a current rate of 0.2 C. After the charging, the test battery was discharged to 2.5 V at a current rate of 0.2 C. The discharge capacity at this time was considered to be a capacity after storage. A capacity retention rate was obtained by dividing the capacity after storage by the initial capacity. The capacity retention rate is shown in the following Table 1. It is considered that the higher the capacity retention rate, the better the storage characteristics.

TABLE 1

|  | Initial charging | | | | Battery | Storage characteristics |
|---|---|---|---|---|---|---|
|  | First step | | Second step | | Si material | 60° C. 28 days |
|  | First current rate /C | Intermediate voltage /V | Second current rate /C | Maximum voltage /V | Average mesh size /nm | Capacity retention rate /% |
| Comparative Example 1 | 1 | — | 1 | 4.3 | 8.2 | 72 |
| Comparative Example 2 | 0.8 | 3.75 | 1 | 4.3 | 8 | 75 |
| Comparative Example 3 | 0.5 | 3.75 | 1 | 4.3 | 7.8 | 78 |
| Comparative Example 4 | 0.1 | 3.75 | 0.1 | 4.3 | 1.8 | 78 |
| Comparative Example 5 | 0.3 | 3.75 | 0.1 | 4.3 | 1.7 | 75 |
| Comparative Example 6 | 0.3 | 3.4 | 1 | 4.3 | 8.5 | 68 |
| Example 1 | 0.1 | 3.75 | 1 | 4.3 | 3.5 | 85 |
| Example 2 | 0.3 | 3.75 | 1 | 4.3 | 2.8 | 83 |
| Example 3 | 0.1 | 3.75 | 0.3 | 4.3 | 3.3 | 84 |
| Example 4 | 0.1 | 3.9 | 1 | 4.3 | 3.1 | 86 |

Result

As shown in Table 1 above, when the average mesh size is 2.8 nm to 3.5 nm, the storage characteristics tend to be improved.

Figure 5:
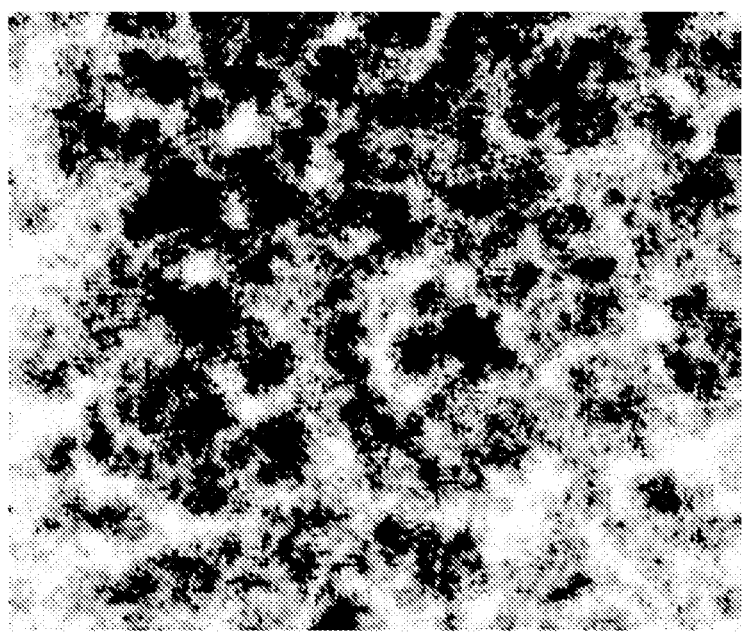
FIG. 5 is a second example of the Si distribution image by STEM-EELS.

FIG. 4 is a first example of a Si distribution image by STEM-EELS. FIG. 5 is a second example of a Si distribution image by STEM-EELS. FIG. 4 shows a Si distribution image (Si alloy phase) in Comparative Example 1. FIG. 5 shows a Si distribution image in Example 1. The observation magnification of FIG. 4 is the same as the observation magnification of FIG. 5. It is considered that the three-dimensional network structure of the Si alloy phase is denser in FIG. 5 (Example 1) than in FIG. 4

Comparative Example 1

The present embodiment and the present example are merely examples in all respects. The present embodiment and the present example are not restrictive. The technical scope defined by the description of claims includes all modifications semantically equivalent to the description of the claims. The technical scope defined by the description of the claims includes all modifications within the scope equivalent to the description of the claims.

What is claimed is:

1. A manufacturing method of a lithium-ion battery comprising:
    assembling the lithium-ion battery; and
    performing an initial charging on the lithium-ion battery,
    wherein:
    the lithium-ion battery includes a positive electrode, a negative electrode, and an electrolyte;
    the negative electrode contains a negative electrode active material;
    the negative electrode active material contains a precursor of a silicon material;
    the precursor has a composition represented by $SiO_x$ where a relationship of $0<x<2$ is satisfied;
    the initial charging includes a first step and a second step;
    in the first step, the charging is performed to an intermediate voltage at a first current rate;
    in the second step, the charging is performed from the intermediate voltage to a maximum voltage at a second current rate;
    the first current rate is 0.1 C to 0.3 C;
    the second current rate is 0.2 C or more higher than the first current rate; and
    the intermediate voltage is 3.75 V or higher,
    wherein the negative electrode active material, after initial charging of the lithium-ion battery, contains a silicon material;
    the silicon material contains a silicon alloy phase and a silicate phase;
    the silicon alloy phase has a three-dimensional network structure;
    the silicate phase is arranged in a mesh of the three-dimensional network structure;
    the three-dimensional network structure has an average mesh size of 2.8 nm to 3.5 nm; and
    the lithium-ion battery has a minimum capacity retention rate of 83%, and the capacity retention rate is measured by the following steps:
    a test battery is charged to 4.2 V at a current rate of 0.2 C and then stored in a charged state for 28 days in a thermostat set at 60° C.,
    after the 28 days, the test battery is discharged to 2.5 V at a current rate of 0.2 C in a room temperature environment,
    next, the test battery is charged to 4.1 V at a current rate of 0.2 C,
    after the charging, the test battery is discharged to 2.5 V at a current rate of 0.2 C, at which time, the discharge capacity is considered to be a capacity after storage, and
    the capacity retention rate is obtained by dividing the capacity after storage by the initial capacity.

2. The manufacturing method of the lithium-ion battery according to claim 1, wherein the negative electrode active material further contains a carbon material.

3. The manufacturing method of the lithium-ion battery according to claim 1, wherein the initial charging may be performed in a room temperature environment.

4. The manufacturing method of the lithium-ion battery according to claim 1, wherein the intermediate voltage is 3.75 V to 3.9 V.

5. The manufacturing method of the lithium-ion battery according to claim 1, wherein the second current rate is 0.3 C to 1 C.

6. The manufacturing method of the lithium-ion battery according to claim 1, wherein the maximum voltage is 4.1 to 4.3 V.

7. The manufacturing method of the lithium-ion battery according to claim 1, wherein the maximum voltage is 4.2 to 4.3 V.

8. The manufacturing method of the lithium-ion battery according to claim 1, wherein after the initial charging, the battery is discharged.

9. The manufacturing method of the lithium-ion battery according to claim 8, wherein the battery is discharged by performing heat aging on the battery.

10. The manufacturing method of the lithium-ion battery according to claim 9, wherein the heat aging is leaving the battery in a temperature environment of 50° C. to 70° C. for about 24 hours to 48 hours.

11. The manufacturing method of the lithium-ion battery according to claim 1, wherein the average mesh size is 2.8 nm to 3.3 nm.

12. The manufacturing method of the lithium-ion battery according to claim 1, wherein the average mesh size is 3.1 nm to 3.5 nm.

13. The manufacturing method of the lithium-ion battery according to claim 1, wherein the average mesh size is 3.1 nm to 3.3 nm.

* * * * *